United States Patent
Delaney et al.

(10) Patent No.: US 7,376,756 B2
(45) Date of Patent: May 20, 2008

(54) HDD FIRMWARE DOWNLOAD

(75) Inventors: William P. Delaney, Wichita, KS (US); William A. Hetrick, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 265 days.

(21) Appl. No.: 10/701,019

(22) Filed: Nov. 3, 2003

(65) Prior Publication Data

US 2005/0097236 A1    May 5, 2005

(51) Int. Cl.
*G06F 3/00* (2006.01)
*G06F 9/00* (2006.01)

(52) U.S. Cl. .................. 710/5; 710/62; 713/1; 713/2; 713/100

(58) Field of Classification Search ................ 717/168
See application file for complete search history.

(56) References Cited

U.S. PATENT DOCUMENTS

| | | | |
|---|---|---|---|
| 6,209,060 B1 * | 3/2001 | Machida | 714/7 |
| 6,622,302 B1 * | 9/2003 | Delaney et al. | 717/168 |
| 6,789,157 B1 * | 9/2004 | Lilja et al. | 717/168 |
| 2001/0014093 A1 * | 8/2001 | Yoda et al. | 370/389 |
| 2002/0166027 A1 * | 11/2002 | Shirasawa et al. | 717/168 |
| 2003/0217358 A1 * | 11/2003 | Thurston et al. | 717/174 |
| 2004/0068548 A1 * | 4/2004 | Sugita | 709/208 |
| 2004/0150851 A1 * | 8/2004 | Sato | 717/168 |

* cited by examiner

*Primary Examiner*—Alan S. Chen
(74) *Attorney, Agent, or Firm*—Cochran, Freund & Young LLC (57) ABSTRACT

A system and method for packaging a command string in an offline mode into a script, transmitting the script, and using a controller to read the script and send commands and data to an individual device attached to the controller. The script may contain a header and one or more action and action payloads. When the script is interpreted by the controller, various commands and data may be passed directly to the individual device. Such a system may be useful for performing low level commands on the device, including loading firmware.

21 Claims, 5 Drawing Sheets

400
HEADER
PROCESSING

HDD FIRMWARE DOWNLOAD

BACKGROUND OF THE INVENTION a. Field of the Invention

The present invention pertains generally to firmware downloading mechanisms and more specifically to remotely preparing downloading instructions for downloading firmware through a controller to a disk drive.

b. Description of the Background

Many storage systems are comprised of a multitude of disk drives. For example, RAID systems are one such type of storage system wherein multiple disk drives are arranged in various manners for performance and redundancy of data. In such systems, many disk drives may be connected to a controller that portions out the data to the individual disk drives according to the redundancy and performance scheme.

During the life of a storage system, which may span several years, improvements may be made to the disk drive components. In particular, improvements or changes to the firmware of the disk drive may be made by the disk drive manufacturer or other entity. Such firmware changes may allow additional commands, may improve reliability, or otherwise enhance performance of the disk drive.

For deployed systems, making changes to disk drive firmware can be a complicated task, particularly for disk drives that do not have a command structure or are not specifically adapted for firmware updates. For example, lower cost disk drives typically do not have a simple command structure for downloading, installing, and running an updated firmware image. Such a process may involve many commands and data transfers that must occur in a specific sequence. To further complicate matters, each manufacturer of disk drives may have a different command sequence required for downloading, and such command sequences may change from model to model of disk drive.

A storage system controller may be capable of communicating and controlling the individual disk drives, but may not be adapted to communicate using the specific protocol required for each model of disk drives from each of the various manufacturers.

It would therefore be advantageous to provide a mechanism whereby firmware downloads and other low level communications to a disk drive may be accomplished with a minimum of complexity and effort on the part of a storage system controller. It would be further advantageous to provide a system and method that may be tested and verified before being executed in the field.

SUMMARY OF THE INVENTION

The present invention overcomes the disadvantages and limitations of previous solutions by providing a system and method for packaging a sequence using an offline utility to generate a download script. The download script may be executed by a storage system controller to send commands, receive responses, and transmit data as required to update firmware or otherwise communicate to the disk drive. The download script may be tested and verified offline before being transmitted to the controller for updates in the field.

An embodiment of the present invention may therefore comprise a method for communicating to a component of a system controlled by a controller comprising: packaging a communication sequence into a script by a method comprising: providing the communication sequence that is a specific set of actions and action data; for each of the actions, creating an action header comprising an action code and zero or more component specific commands, and creating an action payload comprising zero or more of the action data; transmitting the script to the controller; and communicating to the component of the system by running the script by the controller by a method comprising: providing the script to the controller; and for each of the action headers, executing a command corresponding to the action code, transmitting the zero or more component specific commands to the component, and transmitting the zero or more of the action data from the action payload to the component.

Another embodiment of the present invention may comprise a system for communicating to a component of a system controlled by a controller comprising: a first computer system adapted to package a communication sequence into a script by a method comprising: providing the communication sequence that is a specific set of actions and action data; for each of the actions, creating an action header comprising an action code and zero or more component specific commands, and creating an action payload comprising zero or more of the action data; and a controller adapted to communicate with the component of the system by a method comprising: providing the script to the controller; and for each of the action headers, executing a command corresponding to the action code, transmitting the zero or more component specific commands to the component, and transmitting the zero or more of the action data from the action payload to the component.

Yet another embodiment of the present invention may comprise a system for communicating to a component of a system controlled by a controller comprising: a first means for packaging a communication sequence into a script by a method comprising: providing the communication sequence that is a specific set of actions and action data; for each of the actions, creating an action header comprising an action code and zero or more component specific commands, and creating an action payload comprising zero or more of the action data; a second means for communicating with the component of the system by a method comprising: providing the script to the controller; and for each of the action headers, executing a command corresponding to the action code, transmitting the zero or more component specific commands to the component, and transmitting the zero or more of the action data from the action payload to the component.

The advantages of the present invention are that complex communication sequences, required for low level communication and control of a disk drive, may be created offline, tested, and transmitted to a controller for execution. The controller does not require complex and varied protocol logic that may be required to communicate with a wide variety of disk drives, but only a simple communication utility that may understand and execute the predetermined script. The controller may be greatly simplified while being able to handle a much wider variety of tasks with a wider variety of disk drives. Further, changes that are implemented after a storage system is in the field, such as providing updates to new replacement disk drives that have new command structures can be simply accomplished by running the appropriate script. The controller does not require updating in order to communicate with the new replacement disk drive.

DETAILED DESCRIPTION OF THE INVENTION

Figure 1:
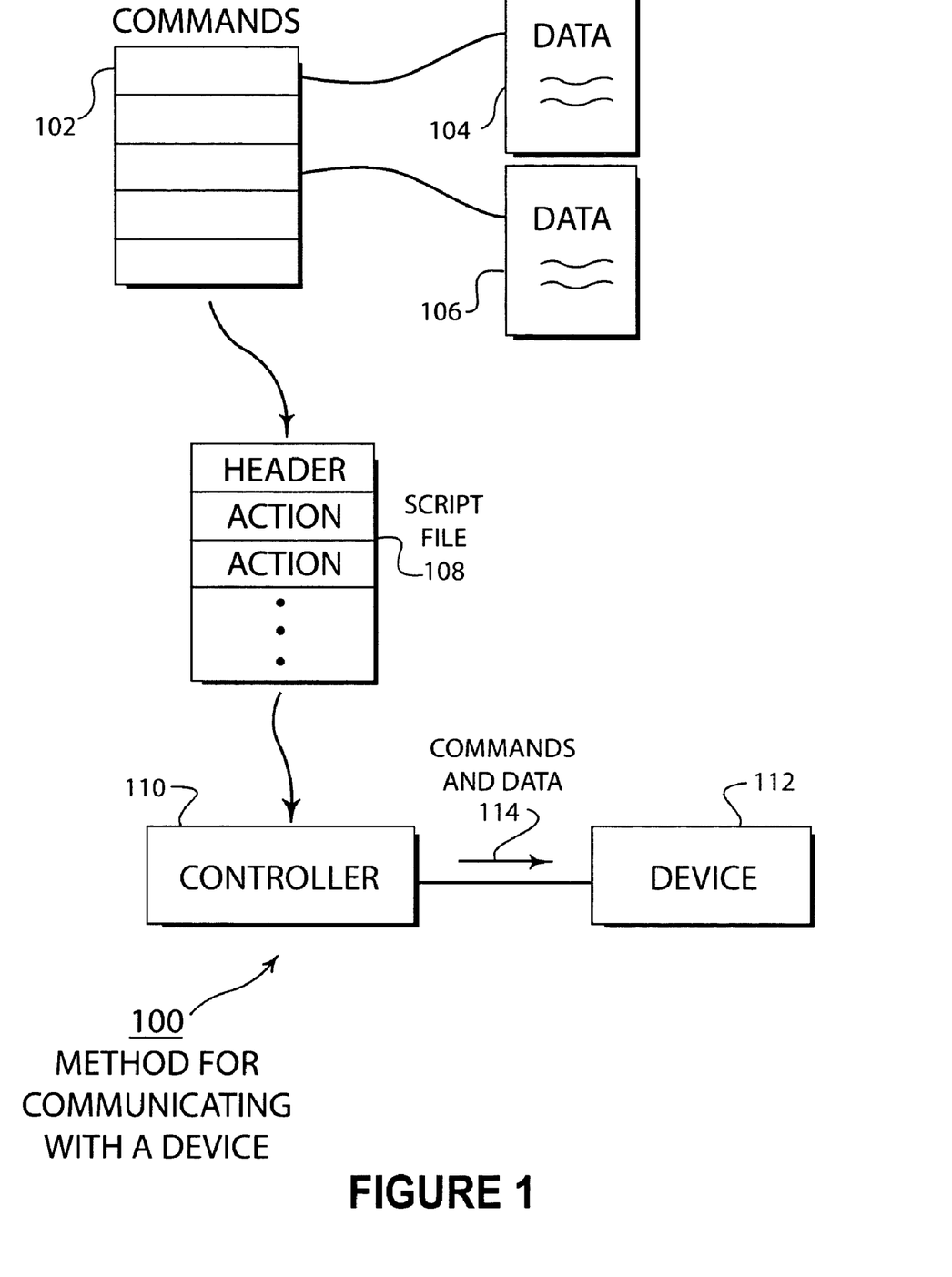
FIG. 1 is an illustration of an embodiment of the present invention showing a method for communicating with a device.

FIG. 1 illustrates an embodiment 100 of the present invention showing a method for communicating with a device. A set of commands 102, some of which have data 104 associated therewith are converted into a script file 108 that comprises a header and several actions. The script file may be read by a controller device 110 that is in communication with the target device 112. The controller 110, using the script 114, can send commands 102 and data 104 to the device 112.

The embodiment 100 is useful for the communication to various types of devices 112. For example, a storage system may contain a plurality of hard disk drives. The hard disk drives may typically communicate using a standard protocol, such as SCSI, ATA, or other communication protocol. In general, the controller 110 may be capable of performing normal communications using the standardized protocol.

In some cases, the devices such as the hard disk drives may require communication to be performed at a low level that is more cumbersome and complex than the standardized protocol. The controller 110 may not have the proper methods or capability of communicating with the device 112 on such a low level. This may be complicated by the fact that various device vendors may have different low level communications protocols and commands. Further, as devices such as hard disk drives evolve and change, so to does the command set.

The low level communication with the devices may be useful for programming certain parameters such as set up parameters, for loading new firmware, or for other maintenance and set up administration that may occur from time to time.

The commands 102 and data 104 may be the low level commands necessary to perform a specific task by the device 112. For example, the commands 102 and data 104 may be the series of instructions necessary to setup a specific device with a specific set of parameters or the series of commands 102 and data 104 may be the instructions and data necessary to upgrade the firmware operable in the device 112.

The commands 102 and data 104 are prepared in an offline mode into a script file 108. The script file 108 may be transmitted to the controller 110. The controller 110 may interpret the script file 108 and cause the device 112 to be updated or whatever action is intended. By using an offline script generation mechanism, the controller 110 does not need to have the intelligence to communicate with the device 112 on a low level. The controller 110 only needs enough intelligence to read and execute the script file 108.

Figure 2:
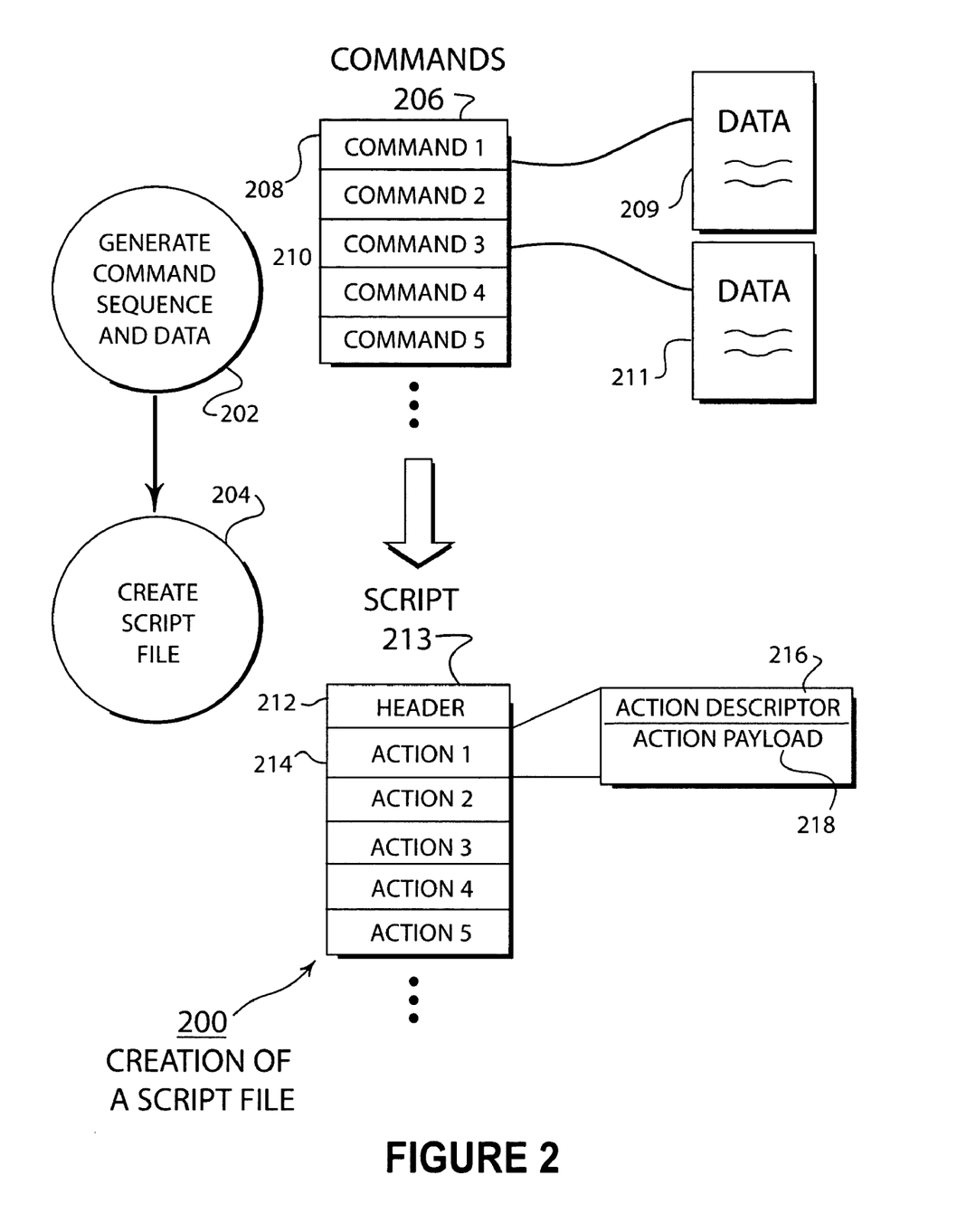
FIG. 2 is an illustration of an embodiment of the present invention showing the creation of a script file.

FIG. 2 illustrates an embodiment 200 of the present invention showing the creation of a script file. The sequence comprises generating a command sequence and data in step 202 and creating a script file in step 204.

The commands 206 may be a series of sequential commands. Various commands may have data associated thereto. For example, command 208 has associated data 209 and command 210 has associated data 211.

The script 213 may have a header 212 and a series of actions 214. Each action may have a descriptor and a payload. For example, action 214 is composed of an action descriptor 216 and an action payload 218.

In some embodiments, the action descriptor 216 may be a simple command that is executed by the controller itself. For example, the action descriptor 216 may cause the controller to execute a specific function such as restart the device, perform a high level command, pass a low level command to the device, or other function. The action descriptor 216 may comprise the specific low level command that is transmitted to the device.

The action payload 218 may contain zero or more data that may be transmitted with the command in the action descriptor 216. The action payload 218 may contain binary data that are transmitted directly to the low level device. In some cases, the action payload 218 may be empty while in other cases the action payload 218 may contain very large amounts of data.

Figure 3:
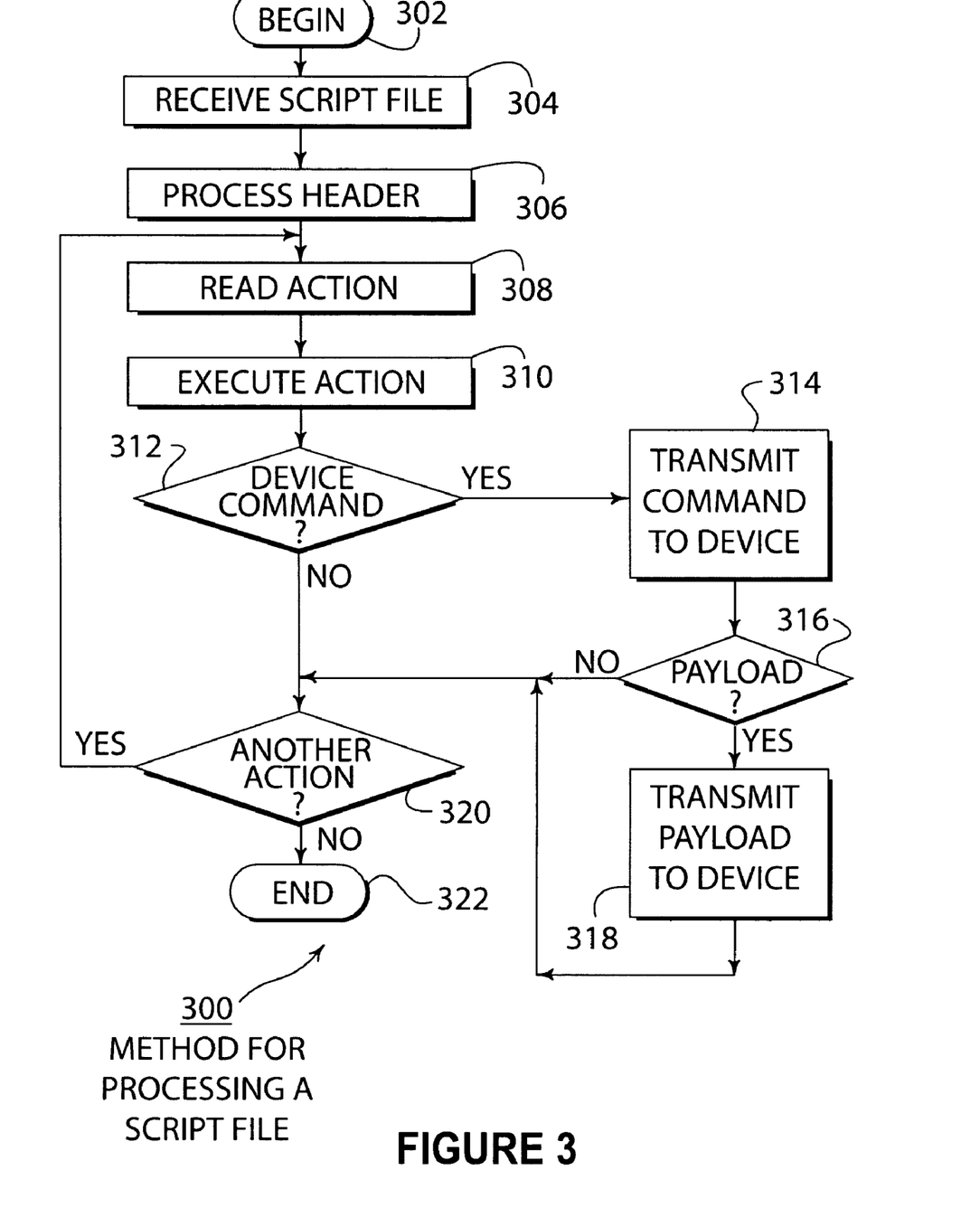
FIG. 3 is an illustration of an embodiment of the present invention showing a method for processing a script file.

FIG. 3 illustrates an embodiment 300 of the present invention showing a method for processing a script file. The process begins in block 302. The script file is received in block 304 and the header is processed in block 306. The first action is read in block 308 and the action is executed in block 310. If the action contains a device command in block 312, the command is transmitted to the device in block 314. If the command includes a payload in block 316, the payload is transmitted to the device in block 318. If the action does not contain a device command in block 312, or if there is no payload in block 316, or if the payload has been transmitted in block 318, and another action exists in block 320, then the process continues in block 308. Otherwise, the process ends in block 322.

The embodiment 300 as shown is one embodiment of the method by which a controller with little or no logic for handling device-specific interactions can communicate with a device by using a script file. The script contains a header and one or more actions. Each action may instruct the controller to perform a function. The function may include sending a command and related data to the device.

In block 310, the controller may execute the action. In some cases, the action may be a command that is executed by the controller itself. For example, the action may be a controller command to reset the device, put the controller in a certain state, or other command that is not sent directly to the device.

In block 314, the controller may send a command directly to the device. In such a case, the controller may send a command to the device without any analysis or interpretation. The command may be sent verbatim. In other cases, the controller may be capable of formatting, changing, or otherwise manipulating the command for a specific purpose. For example, the command as stored in the action may need to be transmitted on a particular set of output lines. In another example, the command may need to be shifted or changed prior to transmitting. Such an example may be used where the command, if stored verbatim in the script file would be incompatible with the file structure or otherwise become problematic.

Figure 4:
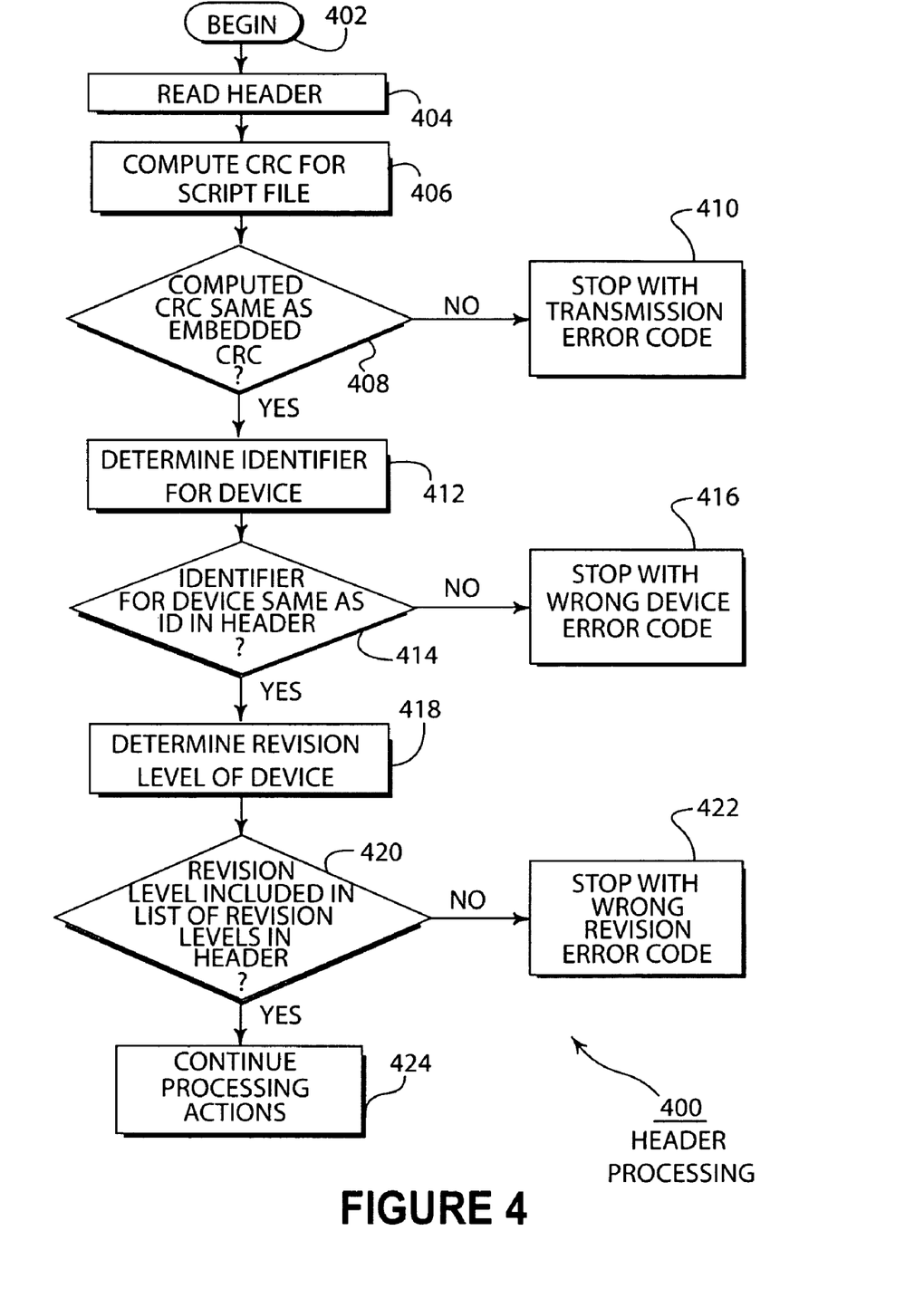
FIG. 4 is an illustration of an embodiment of the present invention showing a method for processing a header of a script file.

FIG. 4 illustrates an embodiment 400 of the present invention showing a method for processing a header of a script file. The process begins in block 402. The header is read in block 404 and a cyclic redundancy check (CRC) is computed for the entire script file in block 406. The computed CRC is compared to the embedded CRC in the script file in block 408. If the computed CRC and the embedded CRC do not match in block 408, the process is stopped with a transmission error code in block 410.

An identifier is determined for the device in block 412. The identifier is compared to an embedded identifier in block 414. If the identifiers do not match in block 414, the process is stopped in block 416. A revision level of the device is determined in block 418 and compared to a list of revision levels in the header in block 420. If the revision level of the device does not fall within the list of revision levels in block 420, the process is stopped in block 420. If the revision level is appropriate in block 420, the process is continued in block 424.

The embodiment 400 illustrates several functions that may be performed in the header portion of the script file. Specifically, the embodiment 400 performs a check on the integrity of the script file by computing a CRC and comparing the computed CRC to a predetermined CRC that is embedded in the script file. Secondly, the embodiment 400 performs a check to determine that the script is appropriate for the device by checking the device identifier and the device revision level against appropriate identifiers and revision levels.

Various methodologies may be employed for determining that the script file is appropriate to process. Computing a CRC is but one example of a method for determining if the script file has been transmitted and received correctly. Those skilled in the arts may use any method, or no method at all, to determine if the script file is correct for processing.

The header may include an identifier for the device for which the communication is intended. The identifier may be different for different applications. For some applications, the controller may be able to query the device for various identification parameters, such as manufacturer, model number, device type, revision level, various settings or options, or other information that may used to identify the proper device for the script file. The identifier may comprise several different parameters and may be obtained through several queries of the device. In addition, once the correct device is determined, the script file may be applicable to one or more specific revision levels of the device.

For example, a script file may be generated to update the firmware of a specific revision of a specific model of a specific manufacturer. The script may applicable to a certain set of revisions that may be described in a list of applicable revision numbers as used by block 420. If the device is a newer revision, it is possible that the device does not need the script to be executed. In some cases, a script may not have the necessary updates for an older version than is on the list of applicable revisions.

The list of acceptable revision levels may be determined by several methods. Each specific applicable revision level may be listed in the header, an upper and lower limit may be used to define a range of applicable revisions, or any other applicable method for indicating acceptable revision levels may be used.

In some cases, an error code may be generated when the script is exited prior to executing the actions in block 424. The error code may indicate what type of problem occurred when the script was executed. In some cases, the controller may not be able to communicate the type of error. In such cases, the abnormal stoppage of the script may not reveal a problem. The type of information communicated when an error occurs may be dependant on the capabilities and requirements of the controller.

Figure 5:
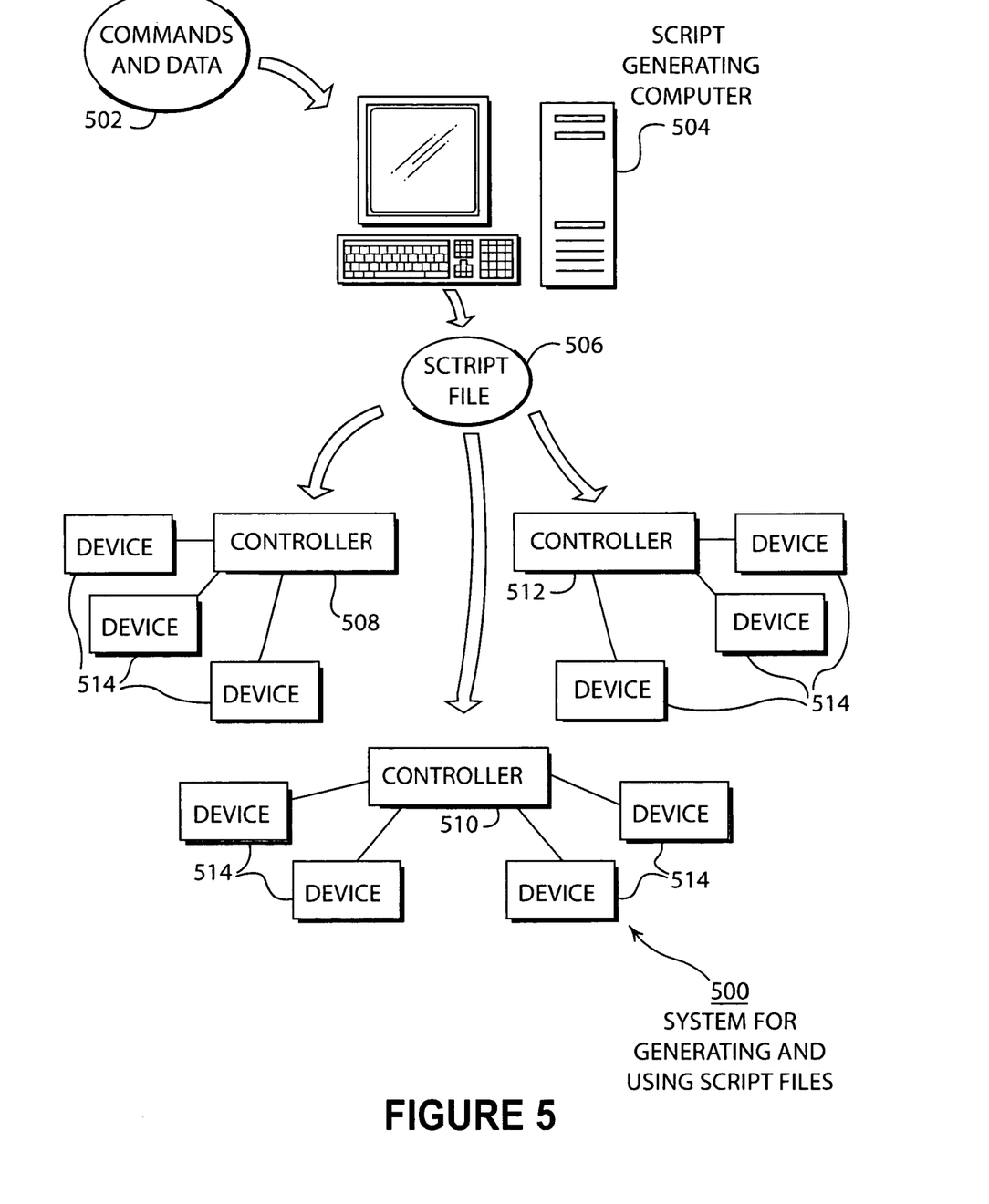
FIG. 5 is an illustration of an embodiment of the present invention showing a system for generating and using script files.

FIG. 5 illustrates an embodiment 500 of the present invention showing a system for generating and using script files. A set of commands and data 502 are used by a script generating computer 504 to create a script file 506. The script file 506 may be transmitted to several controllers 508, 510, and 512. Each of the controllers 508, 510, and 512 may have a plurality of devices 514 attached thereto.

The embodiment 500 may allow a script file 506 to be tested and evaluated offline prior to distributing the script file 506 to various controllers. For example, the script file 506 may be generated by the manufacturer of the various controllers, providing the manufacturer with a vehicle for making updates to the devices 514 that are deployed in the field. Because the scripts are generated by the manufacturer, the manufacturer may retain control of the scripts, ensuring that their products in the field operate properly. In other cases, the script generation may be a utility that may be run by an end user, allowing certain functions and updates to be performed directly by an end user technician.

A particular useful embodiment may be for the updating of firmware for hard disk drives that are attached to a storage management system, such as a RAID controller. In such an embodiment, the manufacturer of the RAID controller may provide various scripts that may be used to update or set various parameters on the individual disk drives that are attached to the controller. Over the life of the RAID controller, new disk drives may replace failed disk drives under normal maintenance. A single controller may control disk drives from different manufacturers or different models or revisions from a single manufacturer. From time to time, the manufacturer of the disk drives may issue an updated firmware release that can be implemented using the present invention.

Rather than program the RAID controller to communicate using the commands and logic required by all the different disk drives, the present invention provides a simple mechanism wherein the controller logic only needs to process the script files. The complexity of programming all of the various disk drives from different manufacturers with different protocols and commands is done in an offline mode by the manufacturer of the RAID controller or someone else. The completed and tested scripts may then be transmitted to the RAID controllers for running.

Because the header information within the script may designate the precise model and revision level of the intended devices, attempts to run an incorrect script would be simply thwarted. Thus, a service technician may be prevented from performing a set of commands on the device that may cause problems or is not appropriate for the device.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for communicating to a component of a system controlled by a controller comprising:
    packaging a communication sequence into a script by a method comprising:
        providing said communication sequence that is a specific set of actions and action data;
        for each of said actions, creating an action header comprising an action code and one or more component specific commands, and creating an action payload comprising zero or more of said action data;
transmitting said script to said controller; and
communicating to said component of said system by running said script by said controller by a method comprising:
providing said script to said controller; and
for each of said action headers, executing a command corresponding to said action code, transmitting said one or more component specific commands verbatim to said component, and transmitting said zero or more of said action data from said action payload verbatim to said component.

2. The method of claim 1 wherein said packaging of said communication is performed by a first computer system that is separate from said system controlled by said controller.

3. The method of claim 1 wherein:
said method of packing said communication sequence further comprises:
creating a header for said script, said header comprising a CRC; and
said method of communicating to said component further comprises:
reading said header of said script;
computing a computed CRC of said script;
comparing said computed CRC to said CRC contained within said header of said script.

4. The method of claim 1 wherein:
said method of packing said communication sequence further comprises:
creating a header for said script, said header comprising an identifier describing the specific component for which said script is intended; and
said method of communicating to said component of said system by running said script by said controller further comprises:
determining a descriptor of said component;
comparing said descriptor of said component to said identifier contained within said header of said script.

5. The method of claim 1 wherein:
said method of packing said communication sequence further comprises:
creating a header for said script, said header comprising a compatibility list comprising one or more applicable revisions of firmware on said specific component for which said script is applicable; and
said method of communicating to said component of said system by running said script by said controller further comprises:
determining a current firmware revision of said component;
comparing said current firmware revision to said compatibility list contained within said header of said script.

6. The method of claim 1 wherein said component is a hard disk drive.

7. The method of claim 6 wherein said controller is a RAID controller.

8. A system for communicating to a component of a system controlled by a controller comprising:
a first computer system adapted to packaging a communication sequence into a script by a method comprising:
providing said communication sequence that is a specific set of actions and action data;
for each of said actions, creating an action header comprising an action code and one or more component specific commands, and creating an action payload comprising zero or more of said action data; and
a controller adapted to communicate with said component of said system by a method comprising:
providing said script to said controller; and
for each of said action headers, executing a command corresponding to said action code, transmitting said one or more component specific commands verbatim to said component, and transmitting said zero or more of said action data from said action payload verbatim to said component.

9. The system of claim 8 wherein said packaging of said communication is performed by a first computer system that is separate from said system controlled by said controller.

10. The system of claim 8 wherein:
said method of packing said communication sequence further comprises:
creating a header for said script, said header comprising a CRC; and
said method of communicating to said component further comprises:
reading said header of said script;
computing a computed CRC of said script;
comparing said computed CRC to said CRC contained within said header of said script.

11. The system of claim 8 wherein:
said method of packing said communication sequence further comprises:
creating a header for said script, said header comprising an identifier describing the specific component for which said script is intended; and
said method of communicating to said component of said system by running said script by said controller further comprises:
determining a descriptor of said component;
comparing said descriptor of said component to said identifier contained within said header of said script.

12. The system of claim 8 wherein:
said method of packing said communication sequence further comprises:
creating a header for said script, said header comprising a compatibility list comprising one or more applicable revisions of firmware on said specific component for which said script is applicable; and
said method of communicating to said component of said system by running said script by said controller further comprises:
determining a current firmware revision of said component;
comparing said current firmware revision to said compatibility list contained within said header of said script.

13. The system of claim 8 wherein said component is a hard disk drive.

14. The system of claim 13 wherein said controller is a RAID controller.

15. A system for communicating to a component of a system controlled by a controller comprising:
a first means for packaging a communication sequence into a script by a method comprising:
providing said communication sequence that is a specific set of actions and action data;
for each of said actions, creating an action header comprising an action code and one or more component specific commands, and creating an action payload comprising zero or more of said action data;

a second means for communicating with said component of said system by a method comprising:
  providing said script to said controller; and
  for each of said action headers, executing a command corresponding to said action code, transmitting said one or more component specific commands verbatim to said component, and transmitting said zero or more of said action data from said action payload verbatim to said component.

16. The system of claim 15 wherein said packaging of said communication is performed by a first computer system that is separate from said system controlled by said controller.

17. The system of claim 15 wherein:
  said method of packing said communication sequence further comprises:
    creating a header for said script, said header comprising a CRC; and
  said method of communicating to said component further comprises:
    reading said header of said script;
    computing a computed CRC of said script;
    comparing said computed CRC to said CRC contained within said header of said script.

18. The system of claim 15 wherein:
  said method of packing said communication sequence further comprises:
    creating a header for said script, said header comprising an identifier describing the specific component for which said script is intended; and
  said method of communicating to said component of said system by running said script by said controller further comprises:
    determining a descriptor of said component;
    comparing said descriptor of said component to said identifier contained within said header of said script.

19. The system of claim 15 wherein:
  said method of packing said communication sequence further comprises:
    creating a header for said script, said header comprising a compatibility list comprising one or more applicable revisions of firmware on said specific component for which said script is applicable; and
  said method of communicating to said component of said system by running said script by said controller further comprises:
    determining a current firmware revision of said component;
    comparing said current firmware revision to said compatibility list contained within said header of said script.

20. The system of claim 15 wherein said component is a hard disk drive.

21. The system of claim 20 wherein said controller is a RAID controller.

* * * * *